July 18, 1944.  A. B. CARMICHAEL  2,353,647
APPARATUS FOR PERFORMING CIRCUMCISIONS
Filed Sept. 19, 1942  3 Sheets-Sheet 1
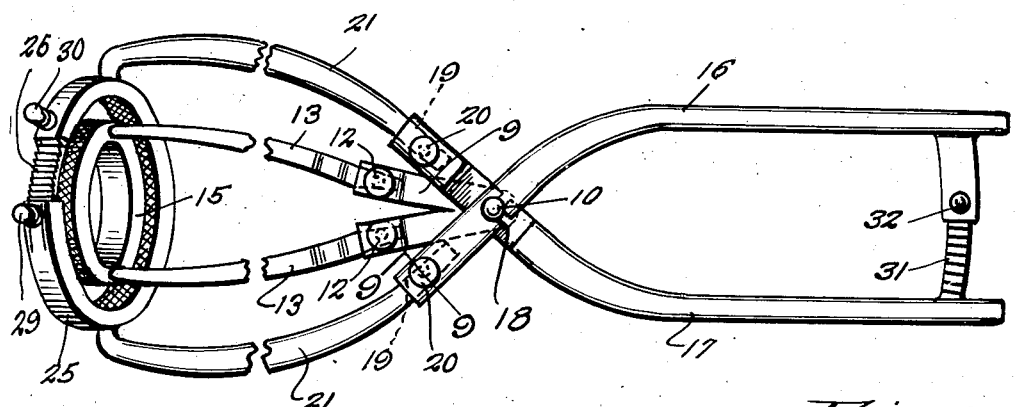
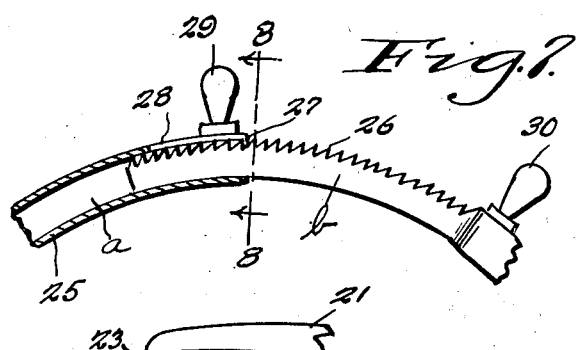
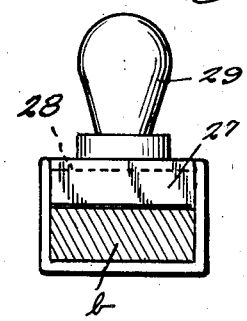
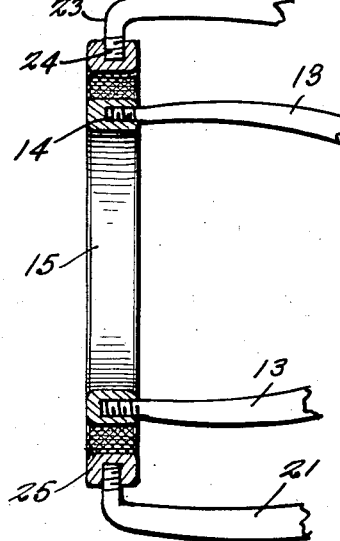
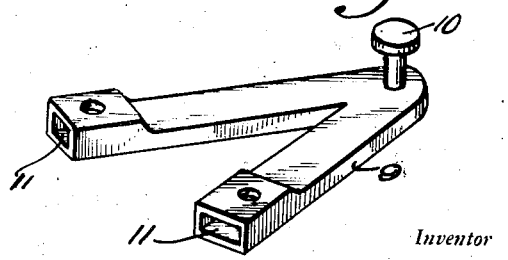
Inventor
Asa B. Carmichael
By Clarence A. O'Brien
and Harvey B. Jacobson
Attorneys July 18, 1944.  A. B. CARMICHAEL  2,353,647
APPARATUS FOR PERFORMING CIRCUMCISIONS
Filed Sept. 19, 1942  3 Sheets-Sheet 2
Fig. 2.
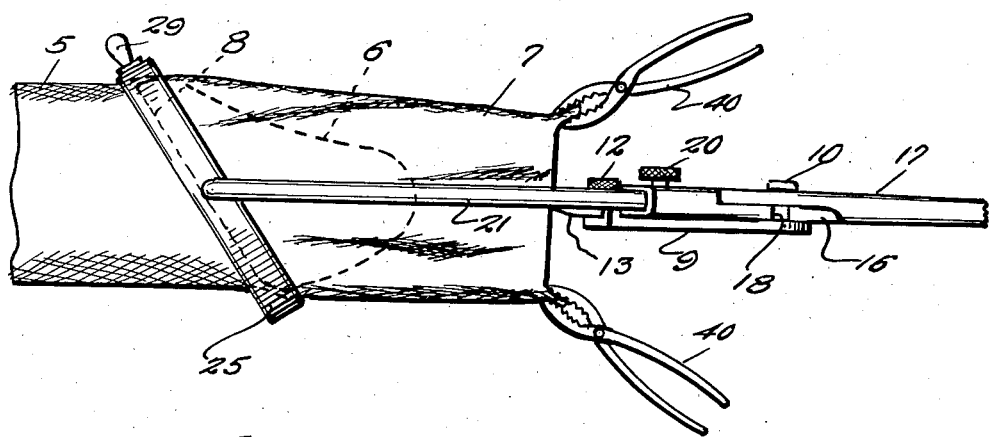
Fig. 3.
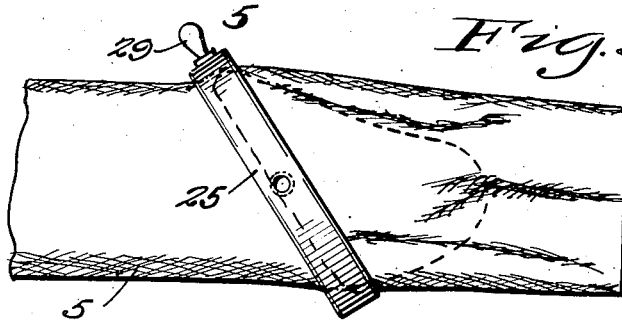
Fig. 4.
Fig. 5.
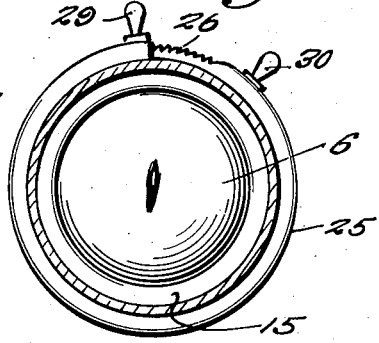
Inventor
Asa B. Carmichael
By Clarence A. O'Brien
and Harvey B. Jacobson
Attorneys July 18, 1944. A. B. CARMICHAEL 2,353,647
APPARATUS FOR PERFORMING CIRCUMCISIONS
Filed Sept. 19, 1942   3 Sheets-Sheet 3
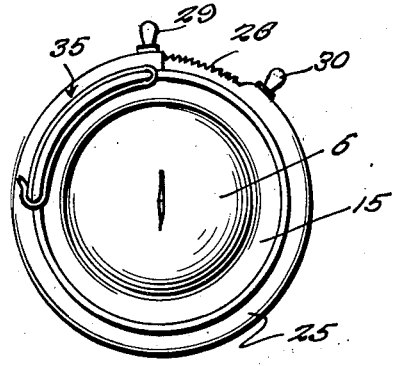
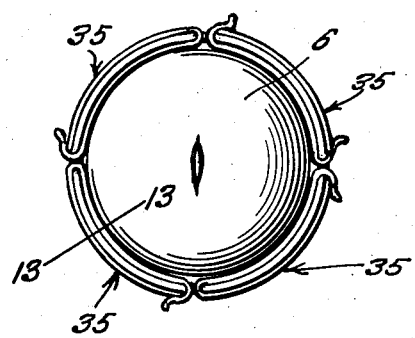
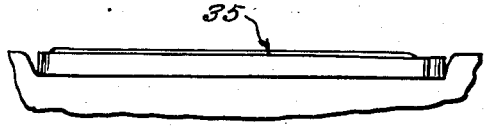
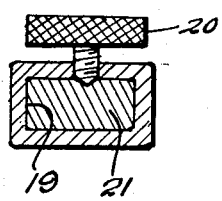
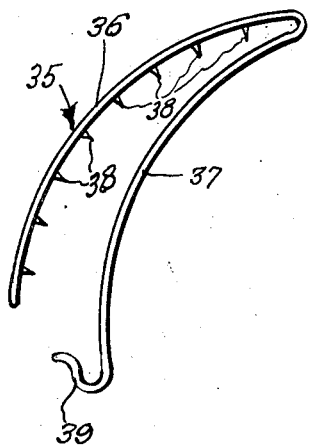
Inventor
Asa B. Carmichael
By Clarence A. O'Brien
and Harvey B. Jacobson
Attorneys Patented July 18, 1944

2,353,647

UNITED STATES PATENT OFFICE 2,353,647

APPARATUS FOR PERFORMING CIRCUMCISIONS

Asa B. Carmichael, Tujunga, Calif.

Application September 19, 1942, Serial No. 458,964

3 Claims. (Cl. 128—346)

This invention relates to new and useful improvements in instruments for performing circumcisions.

An important object of the invention is to provide an instrument which not only assures a bloodless operation but also serves to hold the fore-skin in a fixed circular position to facilitate the cutting operation.

Another important object of the invention is to provide an instrument which can be readily applied, clamped in position and subsequently removed with but a minimum amount of effort and expenditure of time.

Another important object of the invention is to afford an improved instrument where special sutures can be employed in a step by step manner to permit the performance of a quick and efficient circumcision operation.

Other objects and advantages of the invention will become apparent to the reader of the following description.

In the drawings:

Figure 1 represents a perspective view of the instrument.

Figure 2 is a side elevational view showing the instrument applied with the prepuce between the rings and the handles still attached.

Figure 3 is a side elevational view after the arms and handles have been removed and the rings clamped in place.

Figure 4 is a side elevational view showing a short fringe of the prepuce left after the severing operation, and showing the clamp rings still in place.

Figure 5 is a front elevational view of the structure shown in Figure 4.

Figure 6 is a fragmentary vertical sectional view through the rings and showing the arms.

Figure 7 is a fragmentary elevational view with a portion in section showing the adjusting means for the outside ring.

Figure 8 is a section on the line 8—8 of Figure 7.

Figure 9 is a sectional view on the line 9—9 of Figure 1.

Figure 10 is a perspective view of the V-shaped connector.

Figure 11 is a front elevational view of the structure shown in Figure 4 with one of the sutures applied.

Figure 12 is a front elevational view showing all of the sutures applied and the rings removed.

Figure 13 is a section on the line 13—13 of Figure 12.

Figure 14 is a fragmentary top plan view showing a suture applied.

Figure 15 is a perspective view of one of the sutures in open position.

Referring to the drawings wherein like numerals designate like parts, it can be seen in certain of the views that numeral 5 denotes the shaft or body of a penis while numeral 6 denotes the glans or head thereof. Numeral 7 is the prepuce or fore-skin that is to be removed during the circumcision. The prepuce has an outer skin and a mucous membrane lining. At the inner end of the glans is the rim or rounded projecting border which is known as the corona.

In carrying out the present invention, an improved instrument such as is clearly shown in Figure 1 is provided. This instrument includes a V-shaped member 9 having a headed pintle 10 projecting laterally from its apex and having sockets 11 at its ends into which set screws 12, 12 are feedable to adjustably hold the ends of arms 13 in place.

The outer ends of these arms 13 are threaded as at 14 and fit into threaded recesses in a solid ring 15.

Numerals 16, 17 represent crossed handles, each of which has a slotted portion 18 for the reception of the pin 10 on the V-shaped member 9. The forward end of each of these handles 16, 17 has a socket 19 into which is feedable a set screw 20 which is adapted to be driven against the corresponding arm 21, the arms 21 project forwardly and have inwardly disposed foot portions 23 each threaded as at 24 for disposition into threaded sockets in diametrically opposite side portions of a split ring 25. This ring has a hollow end portion $a$ for receiving the solid end portion $b$, the solid end portion $b$ having ratchet teeth 26 thereon with which a tooth 27 or detent on a spring strip 28 is normally engaged to hold the ring 25 in definite circular position. The spring 28 has a knob 29 whereby it may be operated, and the ring 25 at the inner end of the ratchet portion $b$ also has a knob 30.

To hold the handles in closed position, a ratchet member 31 projects inwardly from the handle 17 and is engaged by a suitable spring detent 32.

It can now be seen, that with the instrument in the form shown in Figure 1, the inner ring 15 is slipped over the glans, and within the fore-skin 7, while the outer ring 25 is slipped over the fore-skin. Both rings are then pushed back to the corona 8, where the handles 16, 17 are contracted, binding the ring 25 against the fore-skin 7 and the latter against the inner ring 15.

The set screws 12 and 20 can now be removed, freeing the arms 13, 21 which can be subsequently removed from the rings 15 and 25. The handles 16, 17 can also be disconnected from the pin 10.

This leaves only the rings 15, 25 in applied position as suggested in Figure 3.

The fore-skin is now clamped in such a manner that it can be cut by a scalpel, anteriorly of the rings 15, 25, leaving the penis as shown in Figure 4. There is no bleeding due to the clamped position of the corona portion of the prepuce.

In furthering the operation, special sutures are employed on the remaining portion of the prepuce or foreskin. The fringe of the prepuce is slightly slit longitudinally at circumferential points to accommodate the sutures as shown in Figure 14. These are shown applied in Figure 12. Each suture is generally referred to by numeral 35 and consists of an elongated spring member. The spring member has an arcuate or bowed portion 36 and a second bowed portion 37 which is of the same strip of material bent backwardly in opposed relation to the bowed portion 36. A spring clip head 39 is provided at the free end of the portion 37 for clipped disposition over the free end of the portion 36. The portion 36 has spurs 38 to bite into the flesh.

Figure 11 shows one of these sutures applied to the stump prepuce, while Figure 12 shows all of the sutures applied to prevent bleeding after the rings have been removed and this view shows the rings removed.

After the sutures have been properly placed, the rings are removed.

The prepuce or fore-skin 7 is preferably handled by hemostats 40.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A circumcision instrument comprising an inner fixed ring, an outer adjustable ring, handles for manipulating the outer ring, means for holding the inner ring in concentric relation with respect to the outer ring, said outer ring being split and having a socket at one end and a ratchet extension at its other end disposed into the socket and detent means for engaging the ratchet structure.

2. A circumcision instrument comprising an inner fixed ring, an outer adjustable ring, handles for manipulating the outer ring, means for holding the inner ring in concentric relation with respect to the outer ring, said means for holding the inner ring comprising a pair of arms removably attached to the inner ring and a V-shaped structure attached to the handles and provided with socket and retaining means for holding the inner ends of the arms.

3. A circumcision instrument comprising an inner fixed ring, an outer adjustable ring, handles for manipulating the outer ring, means for holding the inner ring in concentric relation with respect to the outer ring, said means for holding the inner ring comprising a pair of arms removably attached to the inner ring and a V-shaped structure attached to the handles and provided with socket and retaining means for holding the inner ends of the arms, and removable arms interposed between the handles and the outer ring.

ASA B. CARMICHAEL.